United States Patent [19]

Park

[11] Patent Number: 5,063,471
[45] Date of Patent: Nov. 5, 1991

[54] BATTERY PROTECTION CIRCUIT

[75] Inventor: Tae-Hong Park, Inchun, Rep. of Korea

[73] Assignee: SamSung Electronics Co., Ltd., Suwon, Rep. of Korea

[21] Appl. No.: 395,492

[22] Filed: Aug. 18, 1989

[51] Int. Cl.$^5$ .............................................. H02H 7/10
[52] U.S. Cl. ...................................... 361/18; 361/91; 361/111
[58] Field of Search ........................... 361/18, 91, 111; 320/32, 33

[56] References Cited

U.S. PATENT DOCUMENTS 3,582,713  6/1971  Till ........................................ 361/18

Primary Examiner—Todd E. DeBoer
Attorney, Agent, or Firm—Robert E. Bushnell

[57] ABSTRACT

A battery protection circuit for supplying necessary power to a load by starting to discharge electric power of the battery in place of a main power source when the battery is fully charged and thereafter disconnecting itself from the load to be recharged in order to protect the battery from excess currents when the voltage reaches a specified level.

3 Claims, 3 Drawing Sheets

BATTERY PROTECTION CIRCUIT

BACKGROUND OF THE INVENTION

The present invention relates to a battery protection circuit, particularly to a circuit that supplies necessary power to a load by starting to discharge electric power of the battery in place of a main power source when the battery is fully charged and thereafter disconnect itself from the load to be recharged in order to protect the battery from excess currents when the voltage reaches a specified level.

In a conventional method, a battery protection circuit as shown in FIG. 1, has been employed; however, since the prior art method employs a fuse FS as a protective device for batteries against excess currents, there is such an inconvenience that the fuse has to be replaced whenever it is destroyed by an excess current. To have a hysteresis as shown in FIG. 3, the conventional circuit is designed in such a way that a reference voltage Vref fed into each input port of comparators L1, L2 through Zener diodes D1, D2, and a charging current from the battery flowing into other input ports of comparators L1, L2 through a variable resistor VR1 and resistors R3, R4, R5, R6 are each compared in the comparators by way of turning-ONs and turning-OFFs of a plurality of transistors so as to satisfy the hysteresis characteristics; but, the prior art method is not only complicated in its configuration but also requires a relatively large number of parts, thus puts heavier burden on the cost factor.

OBJECT OF THE INVENTION

Therefore, the object of the present invention is to eliminate the inconveniences associated with the use of a fuse by simplifying the circuit configuration for hysteresis and adding a protection circuit against excess currents.

BRIEF DESCRIPTION OF THE DRAWINGS

For a better understanding of the invention and to show how the same might be carried into effect, reference will now be made, by way of example, to the accompanying diagrammatic drawings, in which.

DETAILED DESCRIPTION OF THE INVENTION

In a battery according to the invention, a fixed reference voltage from a battery is applied to an inversion input terminal(−) through a Zener diode D8, a diode D9 and resistors R21, R25, R26, which are linked with a capacitor C1 in parallel; output voltages of the battery are applied, through resistance R22, R23 and R24 and a variable resistance VR2, to a non-inversion input terminal(+) of a comparator L3; output of the comparator L3, which is fed back through resistors R27, R28 and R26 is connected to a gate G1 of field-effect-transistor (FET) F1 through a resistor R32 and also to a collector of a transistor Q7; output of the battery is applied through R29 to a base of a transistor Q7 whose emitter is, through a resistor R31 and a capacitor C2, fed back to a collector of the transistor Q7 and also connected to a source of the FET F1 and the resistor R32; the base of transistor Q7 is connected through a resistor R30 to a collector of transistor Q8, and a base of transistor Q8 whose emitter is grounded and is connected to a collector of transistor Q9 through resistors R33, R38; a base of the transistor Q9 which receives feed-back through R35 is connected through resistor R37 to a drain of the FET F1 and at the same time to the load; and finally through a resistor R39 and a diode D10 coupled in series, the battery is charged.

Figure 1:
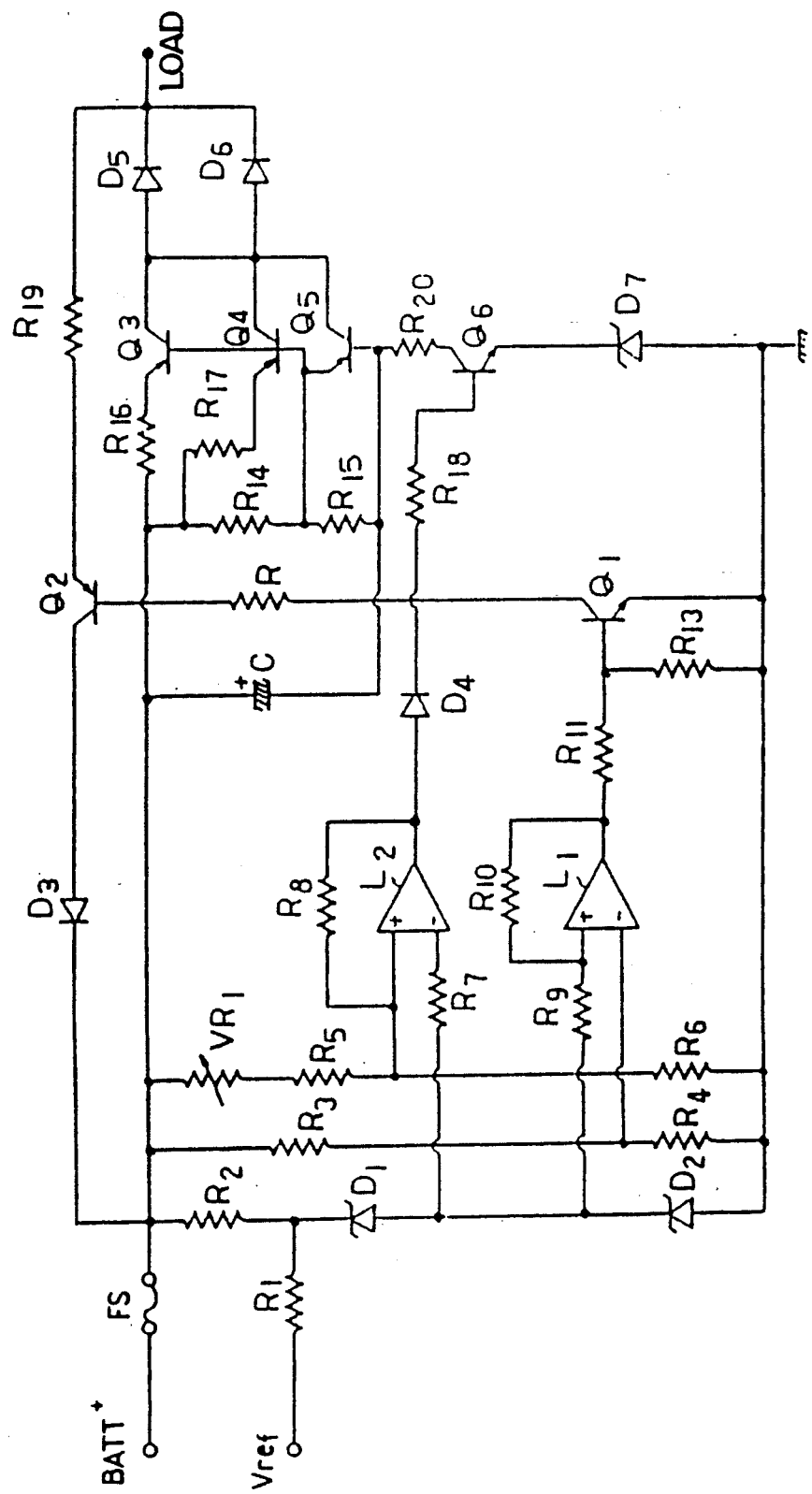
FIG. 1 is a conventional battery protection circuit.
Figure 2:
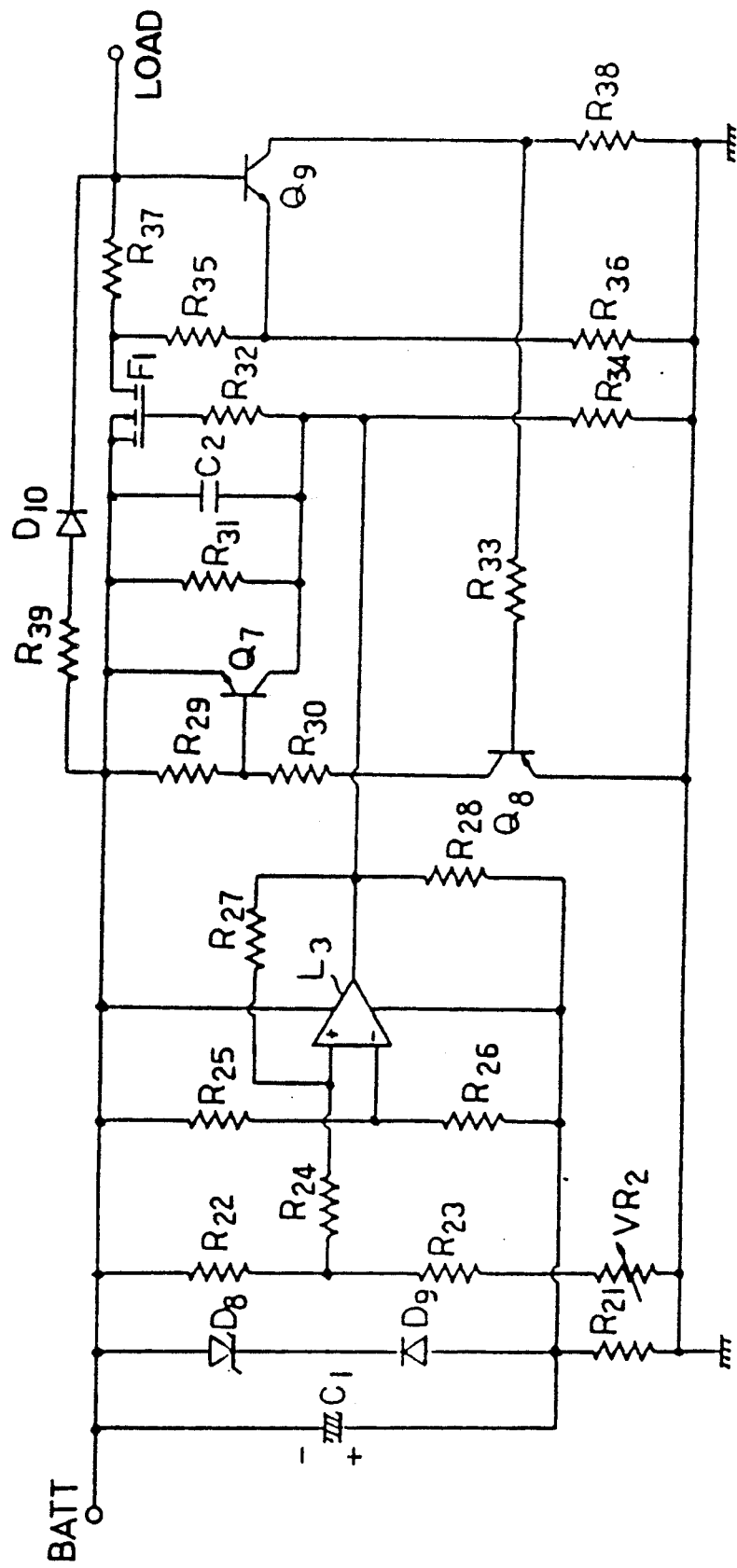
FIG. 2 is a circuit diagram according to the present invention.

Hereinafter, the present invention is described in detail with reference to the FIG. 2. The battery is designed to be charged by the main power up to 48 V through the resistor R39 and the diode D10; at the level above 47 V, the charged voltage is transmitted to the load while at the level below 41 V, battery's link with the load is cut off and the battery is recharged. Due to the characteristics of comparator L3, the charged voltage of the battery flows through the Zener diode D8, the diode D9 and resistor R21, R26 and feeds an input power of 36 volts to the inversion input terminal (−) of comparator L3, so that the battery is protected from being damaged. Meanwhile, in the comparator L3 whose non-inversion input port (+) receives the output voltage of the battery through the variable resistor VR2, the capacitor C1 and the resistors R22, R23, R24, R25, the input voltage levels from both terminals are compared and only when the two voltage levels are identical, a signal of "High" is sent out through its output port into a gate of the FET F1. Then the FET F1 is activated and through the drain D and the source S of said FET F1, the battery is connected with the load, so that appropriate charged voltage is supplied to the load. And now, as the input value of the non-inversion port (+) of the comparator L3 becomes lower than when it (i.e., that is, when FET F1) is not activated, resistance values of the resistors R27, R24 are adequately adjusted in such a way that the output signal of the comparator L3 becomes "Low" at the level of 41 volts where recharging of the battery is activated so that when the voltage decreases to a level lower than 41 volts, the link between the battery and the load is disconnected in order for the battery recharging to be performed through R39 and diode D10.

On the other hand, if there exists excess current while a charged voltage of the battery is transferred to the load through FET F1, the voltages loaded on both ends of the resistor R37 are increased due to the excess current, and when a sum of the voltages loaded on the resistor R37 and the resistor R35 reaches to a level high enough between the base and the emitter of the transistor Q9, the transistor Q9 is turned on and activated. Accordingly, voltages are created on both ends of the resistor R38 and the voltages turn on the transistor Q8, so that voltages are loaded on both ends of the resistor R29 as well, and transistor Q7 also is turned on. Then, a voltage between the gate and the source of the FET F1 is changed to a voltage between the collector and the emitter of the transistor Q7 according to operation of the transistor Q7, resulting in the FET F1 being disconnected and the link between the battery and the load being cut off.

Figure 3:
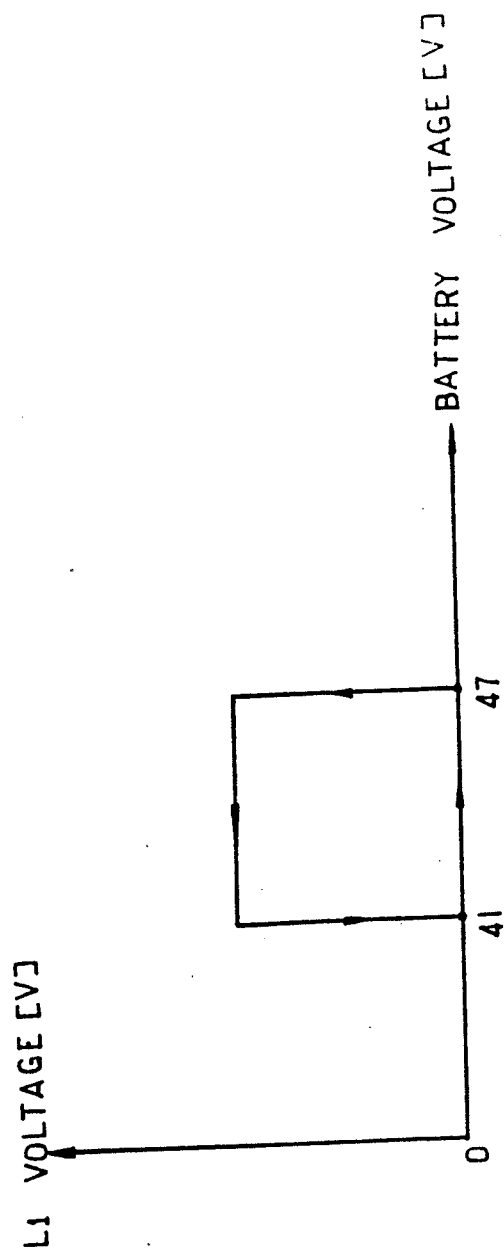
FIG. 3 is a diagram illustrative of conditions of hysteresis characteristics.

Consequently, the present invention is designed in such a way that the hysteresis characteristics of FIG. 3 is satisfied and, thereby, a discharging is carried out when a voltage of the battery reaches a level equal to or more than 47 volts and stops at a level equal to or lower than 41 volts for the battery to be recharged, whereas it is cut off when an excess current flows into the battery.

What is claimed is:

1. A battery protection circuit, comprising:
   means for receiving an output voltage of a battery;
   a comparator;
   a field-effect transistor;
   a first resistor coupled to a gate of said field-effect transistor;
   a first plurality of resistors and a variable resistor to a positive input port of said comparator;
   a feedback resistor;
   means coupled between said receiving means and said negative input port, for applying a first reference potential to said negative input port;
   a first transistor;
   a first resistor;
   the comparator having an output port connected to a gate of said field-effect-transistor through said first resistor so as to provide a particular hysteresis characteristic;
   a third plurality of resistors connected with a collector of said first transistor;
   a load terminal;
   a second transistor;
   a fourth plurality of resistors connected between said load terminal and a drain of said first transistor, said first transistor being turned on or off depending on a voltage across said fourth plurality of resistors, and said third plurality of resistors being connected with a base of said second transistor;
   a third transistor;
   a base of said third transistor being connected through a second resistor to a collector of the second transistor and the emitter of the second transistor being connectable to a second reference potential;
   whereby when the third transistor is turned on, a voltage between the gate and a source of the field-effect transistor is changed to equal the voltage between the collector and the emitter of the third transistor plus a voltage across said first resistor, so that the battery is protected from excess currents.

2. A battery protection circuit, comprising:
   a first node connectable to a battery;
   a second node connectable to a load;
   means having an output terminal and a plurality of input terminals, for comparing a first potential applied to a first one of said input terminals with a second potential applied to a second one of said input terminals, and for generating a comparison signal having a first state at said output terminal when said first potential and said second potential are equal in amplitude;
   a reference terminal connectable to a reference potential;
   first means coupled to said first one of said input terminals, for dividing a voltage coupled across said first node and said reference terminal to apply said first potential to said first one of said input terminals;
   second means coupled to said second one of said input terminals, for dividing said voltage to apply said second potential to said second of said input terminals;
   first means for conducting electrical current between said first node and said second node in dependence upon said comparison signal;
   second means for conducting electrical current between said first node and said second node in the absence of electrical current flowing between said first node and said second node via said first conducting means; and
   means coupled between said first and second nodes, said first conducting means and said reference terminal, for controlling said first conducting means to interrupt flow of electrical current from said first node to said second node, in dependence upon amplitude of electrical current flowing between said first node and said second node via said first conducting means.

3. A battery protection circuit, comprising:
   a first node connectable to a battery;
   a second node connectable to a load;
   means having an output terminal and a plurality of input terminals, for comparing a first potential applied to a first one of said input terminals with a second potential applied to a second one of said input terminals, and for generating a comparison signal having a first state at said output terminal when said first potential and said second potential are equal in amplitude;
   a reference terminal connectable to a reference potential;
   dividing means coupled to said first one of said input terminals, for dividing a voltage coupled across said first node and said reference terminal to apply said first potential to said first one of said input terminals, and for dividing said voltage to apply said second potential to said second of said input terminals;
   first means for conducting electrical current between said first node and said second node in dependence upon said comparison signal;
   second means for conducting electrical current between said first node and said second node in the absence of electrical current flowing between said first node and said second node via said first conducting means; and
   means coupled between said first and second nodes, said first conducting means and said reference terminal, for controlling said first conducting means to interrupt flow of electrical current from said first node to said second node, in dependence upon amplitude of electrical current flowing between said first node and said second node via said first conducting means.

* * * * *

UNITED STATES PATENT AND TRADEMARK OFFICE
CERTIFICATE OF CORRECTION

PATENT NO. : 5,063,471
DATED : 5 November 1991
INVENTOR(S) : Tae-Hong Park

It is certified that error appears in the above-indentified patent and that said Letters Patent is hereby corrected as shown below:

In column 2, line 3, after "grounded", insert comma --,--.

Signed and Sealed this

Third Day of October, 1995

*Attest:*

BRUCE LEHMAN

*Attesting Officer*     *Commissioner of Patents and Trademarks*